July 17, 1928.
C. H. OAKLEY
1,677,200
VULCANIZING APPARATUS
Filed July 13, 1921
2 Sheets-Sheet 2
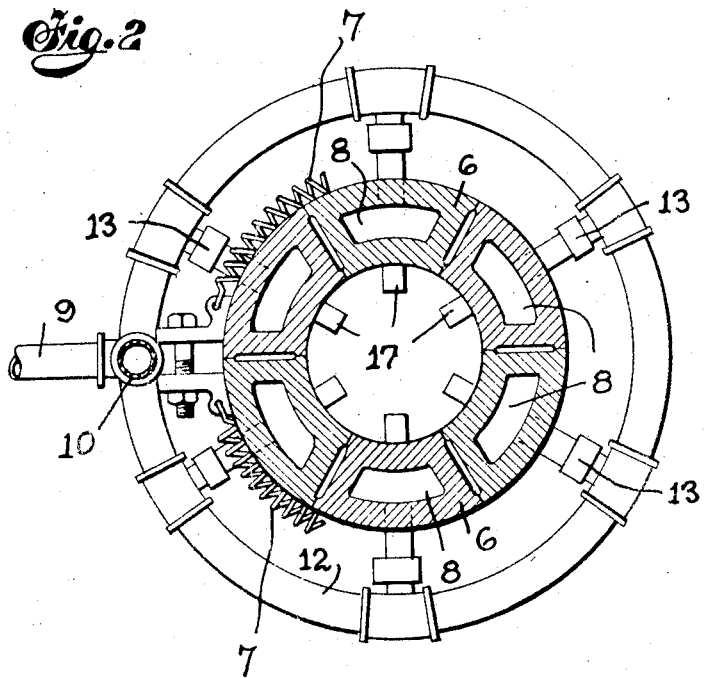
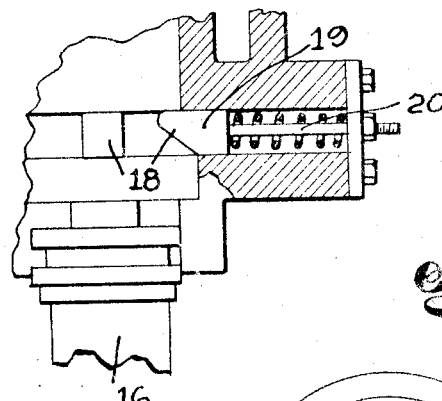
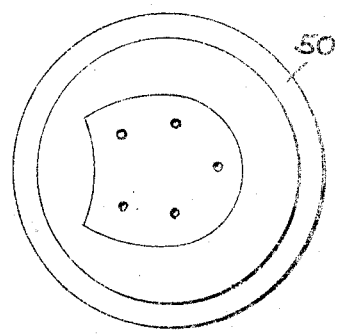
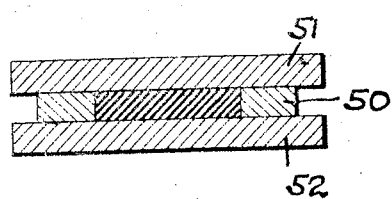
Clifford H. Oakley Inventor
By his Attorneys
Emery, Varney, Blair & Hogarth Patented July 17, 1928.

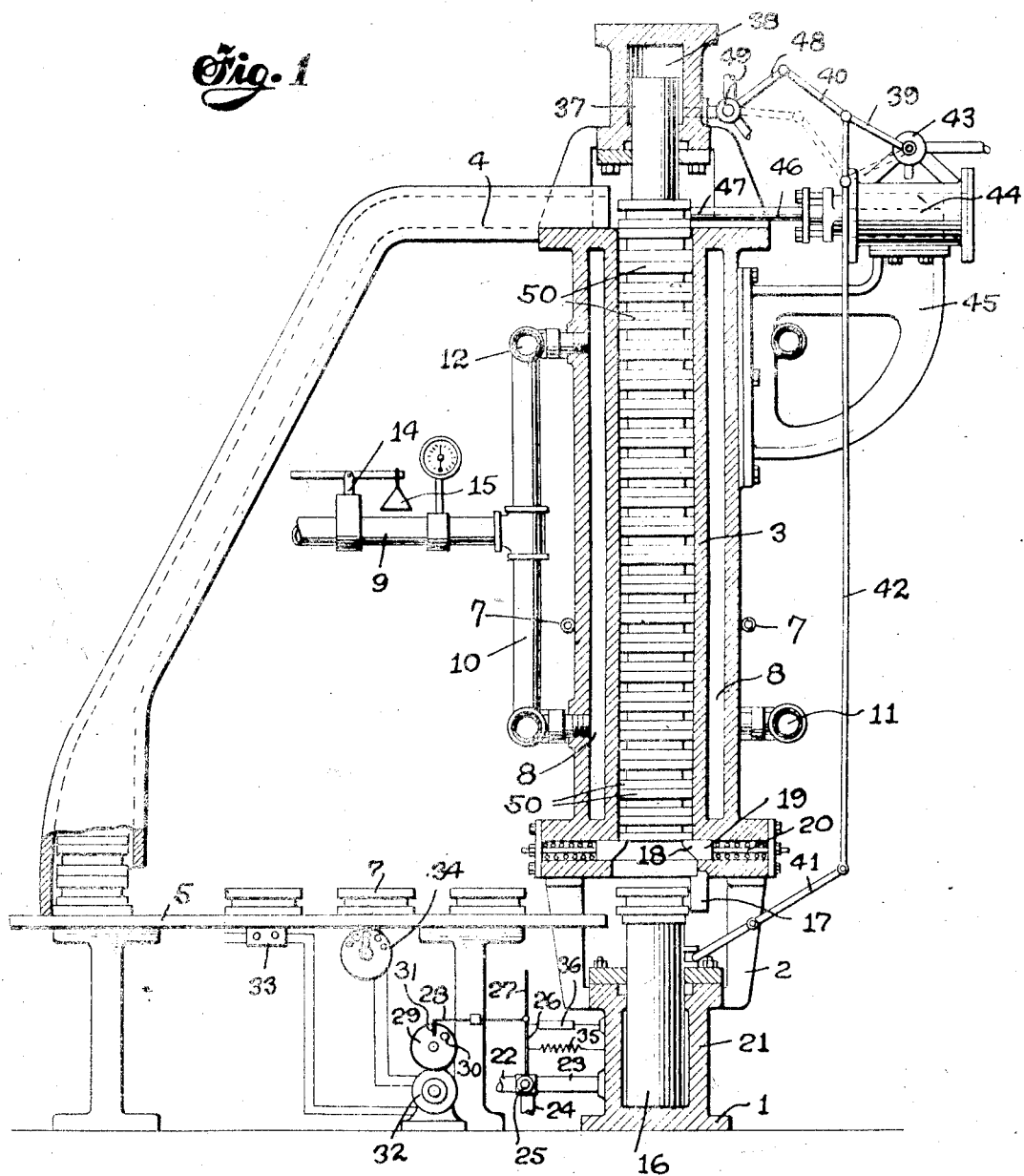

1,677,200

UNITED STATES PATENT OFFICE.

CLIFFORD H. OAKLEY, OF TRENTON, NEW JERSEY.

VULCANIZING APPARATUS.

Application filed July 13, 1921. Serial No. 484,292.

This invention relates to machines for treating semi-formed rubber articles, and more particularly it relates to automatic vulcanizing machines.

One of the objects of this invention is to provide a novel and efficiently operating vulcanizing machine having the molds move progressively therethrough while heat and pressure are applied to properly vulcanize the articles of rubber held within the molds.

Another object of the invention is to provide a vulcanizing machine with automatic mechanism for introducing the molds at predetermined time intervals; for exerting pressure on the molds; and for discharging the molds after the articles contained therein have been properly vulcanized.

Other objects of the invention will be apparent from the following description.

Heretofore in vulcanizing machines each mold has been individually handled as it has been the practice to place the articles of semi-cured rubber in molds, firmly affix the molds to a certain part of a vulcanizing machine to prevent the molds from opening, and then subjecting them to heat. After the rubber has been vulcanized the heat and pressure have been relieved and the rubber articles removed. All of the steps of this process have been performed by hand, and large and cumbersome apparatus has been necessary to provide the individual molds with sufficient heat and pressure. The invention herein to be described contemplates the provision of an automatic vulcanizing machine which eliminates the hand operations and which governs the period of time that a mold shall be subjected to heat and pressure even though each mold does not receive individual attention.

A machine selected as a preferred embodiment of this invention is illustrated in the accompanying drawings, wherein Figure 1 is a side elevational view partly in section of a vulcanizing machine;

Figure 2 is a cross-sectional view of the vulcanizing machine taken on the line 2—2 of Fig. 1;

Figure 3 is an enlarged view of a portion of the lower end of the machine illustrating mold guides and mold supports; and Figures 4 and 5 are, respectively, a cross-sectional view and a top plan view of a mold employed in this machine.

The apparatus to be described in detail may be generally considered as having a heated container with a central opening therein through which molds are progressively passed, and as having synchronously operating automatic means for introducing and discharging the molds and for exerting pressure on the molds at other times. Although the selected embodiment is a machine of the vertical type, it is to be understood that it may be positioned at an angle to the horizontal, or it may be horizontal thereby permitting several vulcanizers to be positioned one above the other to increase the vulcanizing capacity. One of the advantages of the continuous type of vulcanizer is that a large quantity of articles may be vulcanized with the minimum requirement of floor space and of operating equipment. For purposes of description the machine will be described as one employed in the manufacture of rubber heels, although other articles may be made by employing other molds.

Referring to the drawings, the selected vulcanizing machine has a supporting base 1 provided with arms 2 for supporting a cylindrical body or container 3, and mounted on the top of the container is a suitable means for exerting pressure on the top of the molds within the container. A conveyor 4 of suitable form is provided for conducting the molds discharged from the top of the machine to a work table 5 where they are unloaded and refilled and positioned for entrance again into the container.

The body or container 3 is preferably constructed of a plurality of metal sections 6 which are assembled to provide a central passageway constituting a heating zone to permit the molds to be moved therein. Suitable resilient bands 7 are provided for maintaining the sections in assembled position irrespective of their conditions of expansion or contraction. The molds are heated during their movement through the container by providing a suitable heating means, which in this instance is steam supplied to cavities 8 in each of the sections. The steam is conducted from a suitable source (not shown) through conduits 9 and 10 to annular conduits 11 and 12 and thence through slip joints 13 to the several sections. The slip joints are provided to allow for the expansional and contractional movements of the sections due to the heat. A suitable means for governing the steam pressure and to a large degree for regulating the heat is provided in the form of a valve 14 operating under an adjustable weight 15.

In the vertical type of vulcanizer as herein illustrated the molds are preferably introduced at the base. After a mold of a type hereinafter to be described has been filled with the rubber article in semi-cured condition, and in this instance a rubber heel, it is moved from the work table 5 on to a plunger 16 which operates to force the mold into the container and to move the proceeding molds toward the top of the container. The molds are properly positioned on the plunger by means of suitable depending lugs 17 attached to the sections 6 (see Figs. 1 and 3). In the upward movement of the plunger the mold engages tapered surfaces 18 of movable supports 19 and forces these supports backward against springs 20. After the mold has moved to a position above the supports the springs operate to push these supports to their normal positions for supporting the molds; the plunger in the meantime returning to its normal down position. The mold now becomes subjected to the heat of the steam and to a double pressure due to the weight of the other molds and to an exerted pressure later to be described.

The plunger 16 may be operated by any suitable means such for instance as water or a liquid under pressure admitted to a cylinder 21 formed in the base 1 and surrounding the plunger 16. The water is admitted from a source of supply (not shown) to the cylinder through conduits 22 and 23 and is withdrawn through conduits 23 and 24. A suitable valve 25 governs the flow of the water to and from the cylinder. The vulcanizer is adapted to be controlled or operated by hand or automatically by the movement of lever 26 attached to the valve 25. In operating by hand a handle 27 is attached to the lever 26 and is positioned within easy reach of the operator. In operating automatically, one form of mechanism for accomplishing this function is shown as comprising a hooked lever 28 attached to lever 26, a rotating plate 29 provided with a knob 30 for engaging hook 31 on lever 28, and a driving motor 32 for revolving the plate 29. This motor is governed by a starting switch 33 and a resistance 34 both attached to the table 5 and responsive to the will of the operator so that the period of time of operation of the plunger 16 may be governed at will by changing the speed of the motor. The lever 26 is provided with a spring 35 for moving it back to its normal position and the speed of this movement is controlled by a suitable dash pot 36.

In properly vulcanizing rubber articles pressure must be applied to the molds. In this type of vulcanizer the pressure may be applied from the top and for this purpose a piston 37 is hydraulically operated in cylinder 38 to force the molds together while heat is being applied. It is however to be noted that the molds near the base of the container have an additional pressure due to the weight of the molds above. The piston 37 operates in synchronism with plunger 16 so that the pressure on the molds is relieved when a new mold is being introduced and a finished mold is being removed. A system of links and levers comprising valve operating lever 48, connecting link 40 and operating lever 41 and link 42 are moved under the influence of plunger 16 to operate a valve 49 governing the flow of fluid to and from the cylinder 38 for controlling the operation of piston 37 to have this piston move to its non-operative position as a new mold moves into its place at the bottom of the pile.

When a new mold has been introduced at the base of the vulcanizer, the topmost mold has been moved to a position above the container from which position it is moved to the conveyor 4 by any suitable means which also operates in synchronism with plunger 16. The suitable means for moving the mold to the conveyor is illustrated in the form of a double acting piston operating in cylinder 44 which is supported on a bracket 45. An arm 46 carrying a pusher 47, preferably forked, is moved by the piston and engages the mold and moves it out of contact with the next succeeding mold. This arm is then withdrawn and the piston 37 moves into position against the next mold and exerts pressure on the pile of molds. A lever 39 attached to link 42 and to a valve 43 operates this last named valve in synchronism with plunger 16 so that the operation of the pusher 47 is coordinated with the movements of the other operating mechanisms.

In describing the operation of the vulcanizing machine in connection with its application to vulcanizing rubber heels, the molds are filled at the work table with the molded rubber. Preferably these molds accommodate a single heel but they may be enlarged if desired. The construction of a preferred mold is illustrated in Figs. 4 and 5, where a ring 50, preferably made of cast iron constitutes the holding member, and above and below this ring are a top plate 51 and a base plate 52 respectively. These plates preferably are made of material having a coefficient of expansion differing from that of the ring 50. After a mold has been filled it is moved along the work table and on to plunger 16 ready to be introduced into the container. In starting the machine the container is filled with empty molds or a number of cast iron rings so that pressure by piston 37 will be exerted on the molds filled with the rubber material as they are introduced. The automatic operation of the machine provides for the entrance and discharge of a mold at predetermined intervals and the molds in passing from the base to the top of the machine are subjected to heat and pressure and the heels become properly vulcanized during the travel of a mold before it is discharged and carried back to the work table where it is unloaded and refilled.

The vulcanization of the rubber heels may be varied by varying the steam pressure and by varying the speed at which the molds are passed through the container. By the operation of this container a continuous vulcanizing process is obtained while a pressure is intermittently exerted in addition to the pressure due to the weight of the molds.

It will be observed that in the present apparatus the molds are so arranged that the article to be vulcanized is positioned with its edges nearest the source of heat. Ordinarily this is not an advantageous condition in vulcanizing apparatus; it being desired to heat all parts of the article to be vulcanized with substantial uniformity. I therefore so arrange the mold that heat will be transmitted to the heel partly by radiation and partly by conduction; the latter being more efficient. The top and bottom plates 51 and 52 are arranged to contact with the walls of the container so that heat will be more quickly transmitted by conduction to the flat surfaces of the heel, while the middle plate 50 is out of contact with the walls of the container thereby receiving the greater part of its heat by radiation. Moreover, if desired, the top and bottom plates may be made of a metal or alloy such as aluminum of greater thermal conductivity than the middle plate thereby still further hastening the transmission of heat to the top and bottom surfaces of the heel.

The vulcanizing machine as set forth and described as a machine embodying this invention is capable of being modified and is subject to changes, but it is to be understood that such modifications and changes are considered as being within the scope of this invention as outlined by the following claims.

I claim:

1. In a vulcanizing apparatus having a heating zone for applying a vulcanizing heat, the combination with means for supporting a series of molds with some of the molds within the heating zone comprising guides frictionally engaging the molds with yielding pressure, of means for moving the molds forward along said guides and means for maintaining pressure against the end mold of the series while adding a fresh mold to the series.

2. A vulcanizing apparatus comprising a tubular member open at one end and having walls yieldably pressed toward each other, means for applying vulcanizing heat to the walls of said member, means for moving a series of molds progressively step by step through said tubular member and any friction contact with the yieldable walls and means operative at automatically controlled intervals to add a mold to the series at one end and force it foward against the other mold and feed all the molds through a distance substantially equal to the thickness of the added mold.

3. In a vulcanizing apparatus, in combination a work table, a circuit beginning and ending adjacent said table comprising a heating zone having walls yieldably pressed towards each other and means automatically operative to move a succession of molds around said circuit substantially as and for the purpose described.

4. A vulcanizing apparatus comprising a cylinder having expansible walls, a series of molds of a size to fit tightly within the cylinder and frictionally engage the walls thereof and means for forcing the molds in a continuous series through the cylinder.

5. A vulcanizing apparatus comprising parallel ways yieldably pressed toward each other and means for progressively feeding molds forward along said ways and in frictional contact therewith substantially as described.

6. In a vulcanizing apparatus, the combination of a container having yieldable walls presenting a hot zone for applying vulcanizing heat to the molds and capable of having molds pass therethrough, means for exerting pressure on said molds to hold them in closed relation during their movement through said container, and means for introducing said molds at one end of said container and for discharging them from said container at another point.

7. In an upright vulcanizer, the combination of a sectional container having radially yieldable walls for receiving molds having therein articles to be vulcanized, means for heating said container, and automatic means for moving said molds from the base to the top of said container at predetermined speeds.

8. In a vulcanizing apparatus, the combination of a container capable of receiving a plurality of molds containing articles to be vulcanized, means for exerting intensified pressure on said molds, and means for introducing molds into said container at a point where they will be subjected to a pressure when intensified pressure is relieved.

9. In a vulcanizing apparatus, the combination of a plurality of sections maintained in cylindrical assembly by resilient bands, means for heating each of said sections, means for moving molds containing articles to be vulcanized between said sections and in contact therewith, and means for exerting pressure on said molds during their movement.

10. In a vulcanizing apparatus, the combination of a vertical container comprising a plurality of quadrant sections maintained in assembled position by resilient bands, means for introducing steam into cavities in said sections, plunger means in the base of said machine for moving three-part molds containing articles to be vulcanized into said container, said molds having two parts thereof in contact with said sections, a plunger means in the top of said machine for exerting a pressure on said molds, automatic means for moving said second plunger as said first plunger introduces a mold, and means for discharging the top mold from said container.

11. In a vulcanizing apparatus, the combination of a plurality of sections assembled to form a cylindrical opening and to receive circular molds containing articles to be vulcanized, spring pressed supports for said molds at the bottom of said sections, a plunger means for introducing molds into said container and for forcing said supports out of normal position during the introduction of a mold, means for exerting a pressure on said molds, and automatic means for relieving said pressure and for operating a mold discharging means as a new mold is introduced.

12. In a vulcanizing apparatus, the combination of a heated container for receiving a plurality of molds having articles therein to be vulcanized, a hydraulically operated plunger for introducing molds into said container, a second hydraulically operated plunger for exerting pressure on said molds, and a double-acting piston carrying an arm for moving molds from said container, said second hydraulic plunger and said double-acting piston automatically controlled by the movement of said first hydraulic plunger to release the pressure on said molds and to discharge one of said molds from said machine.

13. In a vulcanizing apparatus, the combination of a container consisting of a plurality of sections assembled to form a cylinder and being maintained in position by spring bands, said sections having cavities for receiving steam, an automatic valve for maintaining the steam pressure in said cavities at predetermined values, a hydraulically operated plunger at the base of said machine for moving a mold containing rubber to be vulcanized into said container and against the last-introduced mold, spring pressed supports capable of being pressed aside during the introduction of said mold and of supporting said mold when said operating plunger has been withdrawn, a second hydraulically operated plunger in the top of said machine for exerting a downward pressure on said molds and adapted to move upward as an additional mold is introduced into said machine, an arm at the top of said machine operated by a double-acting piston for pushing the top mold from in under said second plunger, a conveyor for conducting the discharged molds to a work table, and connected arms operated by the movement of said operating plunger for governing valves to said second plunger and to said double-acting piston.

14. In a vulcanizing apparatus, the combination of a heated container capable of having a plurality of molds pass therethrough, the interior surface of said container yieldably contacting with a part of each mold which has a definite coefficient of expansion for conducting heat to the top and bottom faces of the articles held therein and transmitting heat by radiation to another part of said mold being of different coefficient of expansion, said mold adapted to transmit heat uniformly to the article to be vulcanized, and means for moving said molds through said container and for intermittently exerting pressure thereon.

In testimony whereof, I have signed my name to this specification this 23rd day of June, 1921.

CLIFFORD H. OAKLEY.